(12) United States Patent
Palmatier

(10) Patent No.: US 6,912,284 B1
(45) Date of Patent: Jun. 28, 2005

(54) SELF-AUTHENTICATING CRYPTOGRAPHIC APPARATUS

(75) Inventor: Thomas E. Palmatier, Laurel, MD (US)

(73) Assignee: The United States of America as represented by the National Security Agency, Washington, DC (US)

(*) Notice: Subject to any disclaimer, the term of this patent is extended or adjusted under 35 U.S.C. 154(b) by 1826 days.

(21) Appl. No.: 06/509,268

(22) Filed: Jun. 13, 1983

(51) Int. Cl.[7] .............. H04L 9/28; H04L 9/18; H04L 9/20; H04L 9/22

(52) U.S. Cl. .............. 380/44; 380/42; 380/43; 380/46; 380/28; 380/277

(58) Field of Search ............ 178/22.13, 22.14, 178/22.17, 22.19; 380/255, 259, 260–266, 277, 278, 44, 45, 46, 47, 28, 29, 30, 287, 59, 35, 36, 37, 42, 43

(56) References Cited

U.S. PATENT DOCUMENTS

| | | | | |
|---|---|---|---|---|
| 4,172,213 A | * | 10/1979 | Barnes et al. ............ | 178/22.19 |
| RE30,957 E | * | 6/1982 | Feistel ................ | 178/22.19 |
| 4,343,967 A | * | 8/1982 | McArdle ............... | 178/22.19 |
| 4,404,426 A | * | 9/1983 | Safford ............... | 178/22.19 |
| 4,434,322 A | * | 2/1984 | Ferrell ............... | 178/22.13 |

* cited by examiner

*Primary Examiner*—Bernarr E. Gregory
(74) *Attorney, Agent, or Firm*—John R. Utermohle; Thomas O. Maser

(57) ABSTRACT

A self-authenticating apparatus for effecting secure communication of a binary signal. In the encipherment apparatus, key is generated as a function of plain text summed with a pseudorandom linear sequence. The decipherment apparatus performs a reverse function in an autokey mode. Incoming cipher text is summed with generated key to create a plain text stream. As in the encipherment device, key is generated as a function of the resulting plain text summed with a pseudorandom linear sequence.

15 Claims, 4 Drawing Sheets

SELF-AUTHENTICATING CRYPTOGRAPHIC APPARATUS

BACKGROUND OF THE INVENTION

1. Field of the Invention

Figure 1:
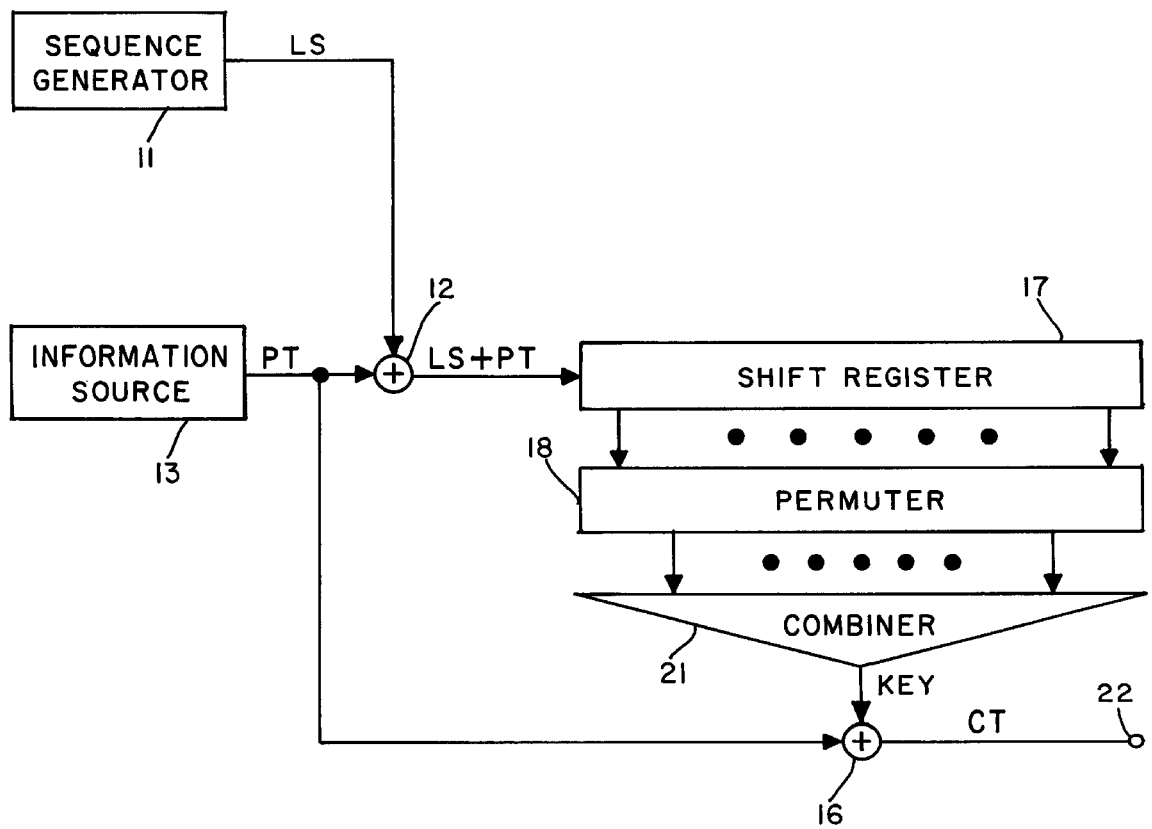

My invention relates to the field of message enciphering and deciphering, and more particularly to key generating by autokey techniques.

2. Description of the Prior Art

Autokey encipherment or encryption refers generally to a substitution cipher in which the key, following the application of an initial key, is determined in whole or in part by preceeding elements of the key or cipher. The most common autokey systems include those known by the terms key autokey and cipher text autokey. In a key autokey encryptor, each key bit generated is a function of one or more prior key bits. Key in a cipher text autokey encryptor is a function of a prior sum of key and plain text bits, that sum comprising the enciphered message.

An important advantage of an autokey system is its ability to self-synchronize; i.e., the receiving key generator is not required to be preset to a previously determined value prior to receiving and decoding cipher messages. Cipher text autokey systems continuously self-synchronize throughout the transmission, while key autokey systems may be initially synchronized by temporarily operating in a CTAK mode until synchronization is achieved. Inherent in prior autokey systems is the feature of limited error extension. That is, a transmission error affects the key generated by the receiver for only a limited number of steps while the bit in error passes through the key generator register, after which the error no longer has any effect. The reverse of limited error extension would be infinite error extension, i.e., an incorrectly received data bit would be inserted into the receiver key generator with the result that all succeeding key bits could be affected.

An advantage of infinite error extension is its capability to insure to a high degree of probability that a message has been received without error. For example, a message to be enciphered might have a plurality of zeros or ones appended to it prior to encipherment and transmission. The receiver would decipher the message, utilizing the received signal to develop the decipherment key. The recovered message would contain the string of appended zeros or ones only if each bit in the enciphered message had been received without error, thereby insuring accuracy to a very high degree of probability. In general, it is well known that m check bits can give at most $2^{-m}$ protection, i.e., the likelihood that an incorrectly received message will test out as correct is $\frac{1}{2}^m$. An encipherment system employing a $2^n$ state key generator can give at most $2^{-n}$ protection. A system utilizing both of the above will provide protection against an error going undetected with a probability equal to the lesser of $2^{-m}$ or $2^{-n}$.

Heretofore, infinite error extension has not been available in any form having acceptable cryptographic characteristics. My invention overcomes this deficiency in the art of enciphered message communications by providing an enciphering/deciphering system having infinite error extension plus a high degree of cryptographic security.

SUMMARY OF THE INVENTION

It is an object of my invention to provide message authenticity with a low probability of error.

A further object is a message encryptor/decryptor having infinite error extension.

A still further object is an improved autokey cipher.

Another object is an autokey system incorporating a linear sequence generator.

Still another object is an autokey system which provides authentication without the need for a parity check code.

It is also an object to present a cryptographic apparatus having self-authenticating capability.

Also, it is an object to provide for encipherment and authentication in a single process, thereby reducing the complexity of the required equipment.

Finally, an object is to provide a capability for self authentication of arbitrary length messages.

An autokey encipherment/decipherment system having these and other desirable capabilities comprises an encryptor including an information signal source, a first pseudorandom signal source, means for summing said information signal and said first pseudorandom signal, means for generating a first key signal, said first key signal being a predetermined function of said summed information and said first pseudorandom signals and means for summing said information and key signals to produce a cipher signal; and a decryptor including means for receiving said cipher signal, a second pseudorandom signal source, means for generating a second key signal, means for summing said cipher signal and said second key signal to produce a plain text signal, and means for summing said second pseudorandom signal and said plain text signal, said second key signal being a predetermined function of said summed plaintext and pseudorandom signals.

DESCRIPTION OF THE PREFERRED EMBODIMENT

FIG. 1 illustrates a digital data encryption device, or encryptor, embodying the essential elements of my invention. It includes a sequence generator 11 having a shift register, the last stage of which is connected to a first input of a modulo-2 adder (exclusive OR logic gate) 12. A source of binary plain text signals 13 is connected to a second input of adder 12 and also to a first input of a second modulo-2 adder 16. The output of adder 12 is connected to the input of the first stage of a second multi-stage shift register 17. A permuter 18 receives a plurality of inputs from register 17 and provides outputs to a combiner 21, described further hereinbelow. The combiner sends a signal output to adder 16. Terminal 22 connects the encoder output to any conventional means (not shown) for conveying the enciphered signal to the decryptor, such as a transmitter or wire line.

Register 17 may be a conventional serial shift register. The number of stages in the register is not of significance to the operation of my invention, although the security of the encrypted message may be improved by the use of a longer register. A typical system might employ a register 17 of about 64 stages.

Figure 3:
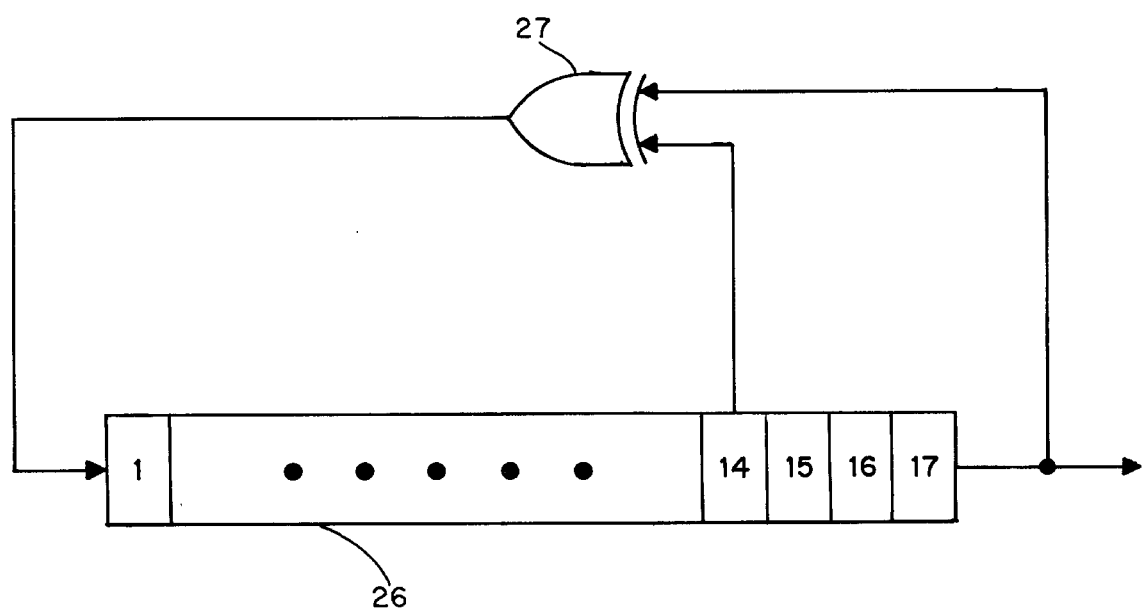

The function of sequence generator 11 is to produce a binary bit sequence which is reproducable by one having knowledge of the device and the initial fill, but which appears random to one not having such knowledge. It is further desirable-that the sequence not be repetitive except over very long periods. One method of achieving such results is to feed the content of selected stages of a shift register into a mod-2 adder and the sum back into the first stage of the register. Maximal length linear sequence generator cycles are readily achievable by proper selection of the register taps, as further described in Peterson, Wesley W., Error-Correcting Codes, (New York: John Wiley & Sons, 1961) pp. 118–123. For example, FIG. 3 illustrates a 17-bit long shift register 26 which will produce a non-repeating cycle of length. $2^{17}-1$ by feeding back the binary sum of stages 14 and 17 via exclusive OR gate 27. In practice, a shift register of 41 or more stages might be used to increase the length of the cycle. It is considered desirable to choose registers having a prime number of stages for this purpose.

Permuter 18, which is an optional feature of my invention, might be a matrix arrangement by means of which stages of register 17 may be selectively routed to inputs of combiner 21. The setting of the permuter should include a large number of possibilities, and comprises the primary variable in the security of the apparatus. In the alternative, the permuter might be as complex as that utilized for the Data Encryption Standard (DES), described in U.S. Pat. No. 3,796,830 to Smith, entitled "Recirculating Block Cipher Cryptographic System", and U.S. Pat. No. 3,798,359 to Feistel, entitled "Block Cipher Cryptographic System."

Figure 4:
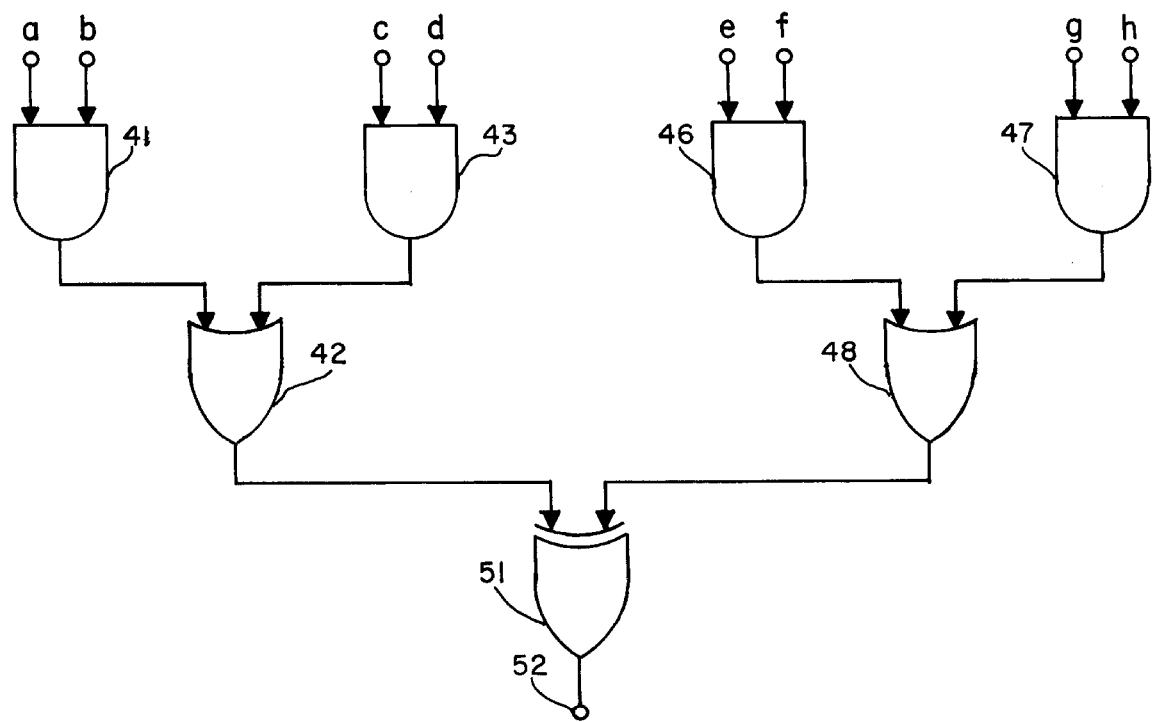

Combiner 21 may be any of $2^{2^n}$ multi-input, single output logic networks where n is the number of stages in register 17. It might be as simple as a 2-input adder or multiplier or as complex as a multi-level network comprising many gates. An eight input combiner is illustrated in FIG. 4 as a representative example. It is desirable that the combiner have a statistically equal likelihood of producing a 0 or a 1 at its output for all possible combinations of inputs. In this particular example, selected stages of shift register 17 are connected either directly or through permuter 18 to the inputs a through h. AND gate 41 multiplies the value of inputs a and b and the product is provided as a first input to OR gate 42. AND gate 43 similarly multiplies the value on inputs c and d, with the product routed to a second input of OR gate 42. The product of inputs e and f from gate 46 and of inputs g and h from gate 47 are ORed together by gate 48. An exclusive OR gate 51 sums the outputs of gates 42 and 48, with the result made available at output terminal 52.

Figure 2:
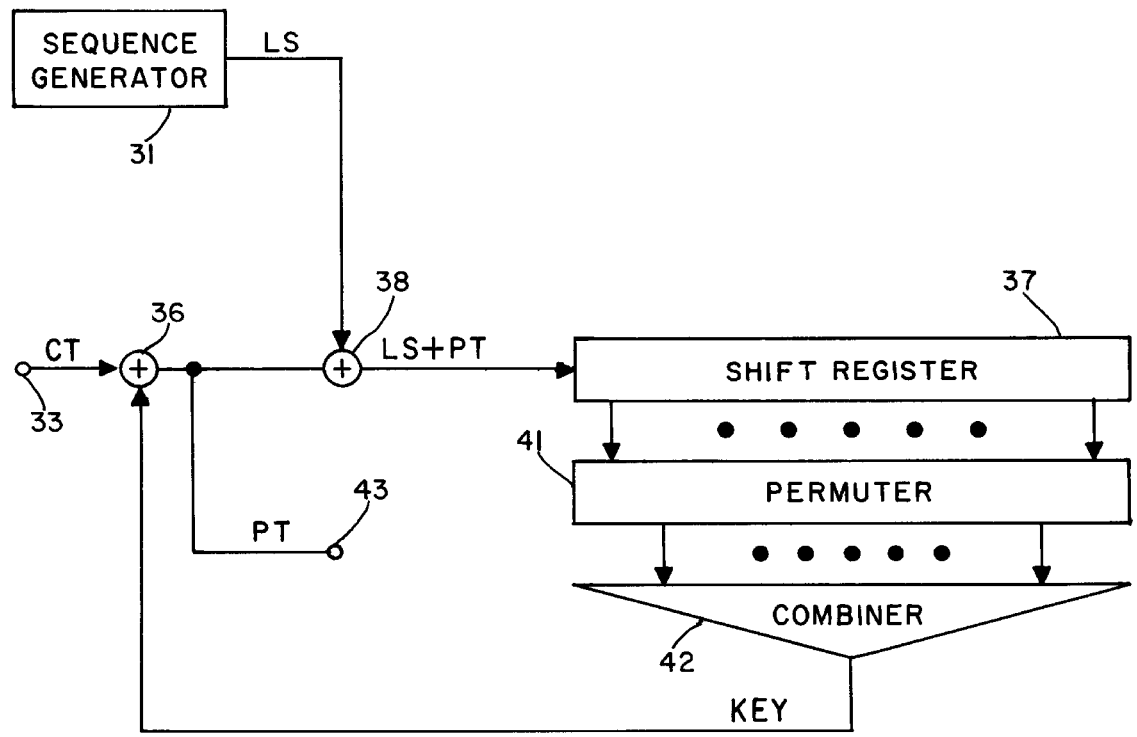

FIG. 2 illustrates a decryptor embodying the essential features of my invention. A sequence generator 31 must be identical to sequence generator 11 in the encryptor of FIG. 1. A terminal 33 connected to a source of enciphered information provides a first input to a modulo-2 adder (exclusive OR gate) 36. A second shift register 37, which must be the same size as register 17 of FIG. 1, is fed by modulo-2 adder 38. Inputs to adder 38 include the output of adder 36 and the output from sequence generator 31. A permuter 41, configured and preset in the same way as permuter 18 of FIG. 1 receives a plurality of inputs from register 37 and routes them to a combiner 42. The output of combiner 42 is connected to a second input of adder 36. The output of the decoder may be detected at terminal 43 for subsequent use.

OPERATION OF THE APPARATUS

My invention finds its primary utility in A digital data encipherment system, the purpose of which is to disguise transmitted information in such away that one having access to the enciphered signal transmitted between terminal 22 of the encryptor and terminal 33 of the decryptor will be unable to figure out the underlying information.

It is necessary that permuters 18 and 41 be preset to an identical state prior to transmission or receipt of data. Also, each of the sequence generators 11 and 31 must be preset to a common state. During the initialization process, the input from formation source 13 is blocked (or set to a constant 0) and generator 11 allowed to step an equal number of times at least equal to the number of stages in register 17. Simultaneously in the receiver, both inputs to adder 36 are blocked and generator 31 is caused to step an equal number of times as generator 11. The result of the foregoing is to fill registers 17 and 37 with an identical, bit sequence. The apparatus is ready to transmit and receive enciphered data when the previously blocked inputs are activated. Referring to FIG. 1, it may be seen that the bit sequence designated CT (cipher text) is the modulo-2 sum of the sequences designated PT (plain text) and KEY. The input to register 17 is the sum of PT and LS, and KEY is uniquely determined by the content of register 17. Referring to FIG. 2, PT is the sum of CT and KEY, and the input to register 37 is the sum of PT and LS.

Note that in both the encryptor and the decryptor, the key register is filled by an identical sequence (PT plus LS) and thus KEY will also be the same in both devices. It necessarily follows that plain text entering the encryptor at terminal 13 will emerge as an identical sequence at terminal 43 of the decryptor.

A unique feature of my invention lies in its ability to insure with a high degree of probability that a message has been received without error. Previously used encipherment systems have not utilized feedback in the decryptor portion of the system. The inclusion of feedback in my invention causes a transmission error to be perpetuated throughout the remainder of the message because KEY is a function of all previous received signals. It is possible therefore to establish with near certainty that a message has been received without error by appending a string of zeros (or ones, or any other preestablished string) at the end of the message to be transmitted. The string of zeros will be present in the deciphered message if all previous bits of the message were received and decoded without error. The preferred embodiment described herein above is subject to many modifications, which will be readily apparent to one skilled in the art, without departing from the scope and spirit of my invention. The claims enumerated below set forth the limits of the invention.

I claim:

1. A secure communications system, comprising:
    an encryptor including an information signal source, a first pseudorandom signal source, means for summing said information signal and said first pseudorandom signal, means for generating a first key signal, said first key signal being a predetermined function of said summed information and said first pseudorandom signals, and means for summing said information and key signals to produce a cipher signal; and decryptor including means for receiving said cipher signal, a second pseudorandom signal source, means for generating a second key signal, means for summing said cipher signal and said second key signal to produce a plain text signal, and means for summing said second pseudorandom signal and said plain text signal, said second key signal being a predetermined function of said summed plaintext and pseudorandom signals.

2. The apparatus of claim 1 wherein said first and second pseudorandom signal sources are linear sequence generators.

3. The apparatus of claim 1 wherein said means for generating first and second signals each comprise a shift register having an plurality of outputs and combining means connected to said outputs.

4. The apparatus of claim 3 wherein said combining means comprises a plurality of logic gates interconnected so as to receive a plurality of inputs and to provide a single output.

5. The apparatus of claim 3 further comprising a permuter connecting the outputs of said shift register and the inputs of said combiner.

6. An encipherment apparatus, comprising:
an information signal source;
a pseudorandom signal source;
means for summing said information signal and said pseudorandom signal;
means for generating a key signal, said key signal being a predetermined function of said summed information and pseudorandom signals; and
means for summing said information and key signals to produce a cipher signal.

7. The apparatus of claim 6 wherein said pseudorandom signal source is a linear sequence generator.

8. The apparatus of claim 7 wherein said key generating means comprises a shift register having a plurality of outputs and combining means connected to said outputs.

9. The apparatus of claim 8 wherein said combining means comprises a plurality of logic gates interconnected so as to receive a plurality of inputs and provide a single output.

10. The apparatus of claim 9 further comprising a permuter connecting the outputs of said shift register and the inputs of said combiner.

11. A decipherment apparatus, comprising:
means for receiving an enciphered signal;
a pseudorandom signal source;
means for generating a key signal;
means for summing said enciphered signal and said key signal to produce a plain text signal; and
means for summing said pseudorandom signal and said plain text signal;
wherein said key signal is a predetermined function of said summed plain text and said pseudorandom signals.

12. The apparatus of claim 11 wherein said pseudorandom signal source is a linear sequence generator.

13. The apparatus of claim 12 wherein said key generating means comprises a shift register having a plurality of outputs and combining means connected to said outputs.

14. The apparatus of claim 13 wherein said combining means comprises a plurality of logic gates interconnected so as to receive a plurality of inputs and provide a single output.

15. The apparatus of claim 14 further comprising a permuter connecting the outputs of said shift register and the inputs of said combiner.

* * * * *